United States Patent Office 3,723,309
Patented Mar. 27, 1973

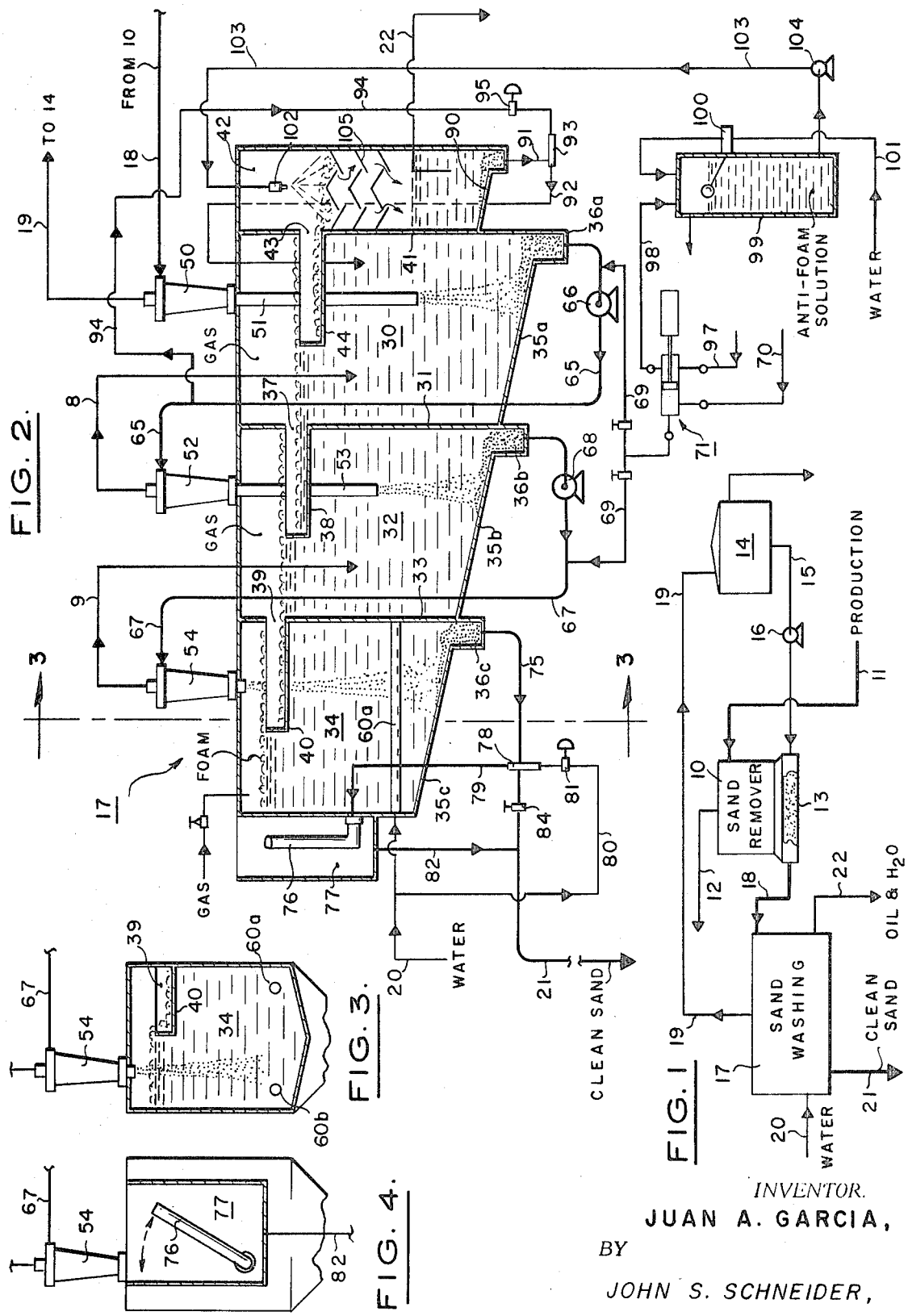

3,723,309
SYSTEM AND METHOD FOR CLEANING OILY
SOLID MATERIAL
Juan A. Garcia, Houston, Tex., assignor to
Esso Production Research Company
Filed Sept. 20, 1971, Ser. No. 181,987
Int. Cl. B01d 17/02
U.S. Cl. 210—44   23 Claims

ABSTRACT OF THE DISCLOSURE

A slurry of solid material, oil and water is pumped from the bottom of a floatation compartment into a cyclone in which the solid material is washed and separated from the oil and water. The lighter, aerated liquid phase separated from the slurry in the cyclone is recirculated to the floatation compartment where the air bubbles in the liquid aid in separating the oil from the water. The separated, heavier solid material is discharged from the cyclone into a rinse compartment. An overflow opening between the rinse and floatation compartments permits liquid in the rinse compartment to overflow into the floatation compartment. A cleansing agent is preferably added to the slurry fed to the cyclone. Additional washing and separating stages may be added as desired.

BACKGROUND OF THE INVENTION

When crude oil is produced from an oil well, formation sand not firmly consolidated is often produced along with the crude oil. If the sand is not removed from the produced liquid stream, plugging of separators and pipelines as well as severe wear of pumps and other production equipment occurs. However, the sand removed from the produced oil must be disposed of in a manner that does not contaminate or pollute the environment. In producing oil from offshore installations, the produced oil wet sand, cannot be discharged directly into the surrounding water without causing objectionable contamination of such water.

The present invention is broadly directed to a method and system for cleansing oily solid material, such as oily sand, in which improved washing, rinsing and recirculation concepts permit disposal of clean solid material without contaminating the environment.

SUMMARY OF THE INVENTION

In accordance with the teachings of the invention, the cleaning system comprises, briefly, a floatation compartment; a cyclone for washing solid material contained in a mixture of oil and water and for separating the washed solid material from the liquid mixture; means for pumping a slurry of the solid material oil and water from the floatation compartment into the cyclone, the action of the cyclone aerating and causing gas bubbles to form in the liquid phase; means for recirculating the separated liquid phase into the floatation compartment, the gas bubbles aiding in separating the oil from the water in the floataion compartment; a rinse compartment; means for discharging the washed and separated solid material from the cyclone into the rinse compartment; and an overflow opening between the rinse and floatation compartments for permitting the liquid in the rinse compartment to overflow into the floatation compartment. The invention also encompasses the steps involved in operating the system.

BRIEF DESCRIPTION OF THE DRAWINGS

FIG. 1 is a schematic illustration of one arrangement in which the sand washing system of the invention may be employed;
FIG. 2 is a schematic view of the sand washing system in accordance with the invention;
FIG. 3 is a view taken on lines 3—3 of FIG. 2; and
FIG. 4 is an end view, partly in section, of the system shown in FIG. 2.

DETAILED DESCRIPTION OF THE INVENTION

As shown in FIG. 1 a sand separator system, indicated at 10, separates sand from oil production liquids introduced into the system through conduit 11. The separated oil and water are sent to an oil and water separator through conduit 12 and the separated sand, indicated at 13, is flushed from separator system 10 by water contained in a tank 14 and pumped through a conduit 15 by means of a pump 16. The flushed water and oily sand is delivered to the sand washing system, indicated at 17, through a conduit 18. The sand washing system 17 is shown in detail in FIGS. 2 to 4. Separated water and oil from system 17 is returned to water tank 14 through conduit 19. Water is added to system 17 through conduit 20. Clean sand is removed from system 17, as indicated at 21, and removal of the separated oil and water is indicated at 22.

Referring to FIGS. 2 to 4, a series of chambers or compartments and cyclone or vortex liquid-solid separators are shown. A receiver-floatation compartment 30 has a common wall 31 with a rinse-floatation compartment 32, which in turn has a common wall 33 with another rinse-floatation compartment 34. Each of the compartments 30, 32 and 34 are formed with sloping bottoms indicated at 35a, 35b and 35c, which are V-shaped, as indicated in FIG. 3 and terminate at one end in a sand-collection sump 36a, 36b and 36c. An opening 37 in wall 31 is connected to an overflow barrier or trough 38 and an opening 39 in wall 33 is connected to a similar barrier or trough 40 positioned above trough 38. Another wall member 41 of compartment 30 forms a common wall with a sand-foam separator compartment 42. Wall member 41 has an opening 43 to which is connected a trough 44 positioned below trough 38. A vortex or cyclone 50 is mounted above compartment 30 and a sand delivery tube 51 extends from cyclone 50 into compartment 30. Another similar cyclone 52 is mounted above compartment 32 and a sand delivery tube 53 extends from cyclone 52 into compartment 32. An additional cyclone 54 is mounted above compartment 34. As shown in FIG. 2, each compartment 30, 32, 34 and 42 has a gas tight top or cover. Gas tight covers on these compartments permits the use of other gas in the cyclones (such as the non-oxidizing discussed below) as well as air. However, when air is to be used in the cyclones then covers for these compartments are not needed.

Perforated pipes 60a and 60b are connected to a source of water, not shown, through a conduit 20. A conduit 65 containing a pump 66 connects through 66a to cyclone 52. Another conduit 67 containing a pump 68 connects through 36b and cyclone 54. A conduit 69 connects a source of sand cleansing agent, not shown, to either or both conduits 65 and 67 through a conduit 70 and 71. A conduit 75 connects trough 36c to a pivotal liquid level control pipe 76, located in a sand discharge compartment 77, through a jet pump 78 and a conduit 79. The pumping liquid to operate jet pump 78 is delivered to the pump through a conduit 80 which is connected to a conduit 20 and a source of water supply. A valve 81 controls operation of jet pump 78. A conduit 82 is connected to the bottom of compartment 77 to discharge clean sand collected in compartment 77 to a discharge conduit 21 which is also connected to conduit 75 through jet pump 78. A normally closed valve 84 is located in conduit 75.

Sand-foam separator compartment 42 also has a sloped bottom 90. A sand discharge conduit 91 connects the bottom of compartment 42 to a conduit 92 through a jet pump 93. Conduit 92 discharges into compartment 30 and the pumping fluid to operate jet pump 93 is supplied by bleeding the liquid slurry in conduit 65 through a conduit 94 which contains a dump valve 95. The separated oil and liquid in chamber 42 is discharged to a sump system, not shown, through conduit 22, which extends below the surface of the liquid in chamber 42. An anti-foam agent is pumped by pump 71 from a source, not shown, through conduits 97 and 98 into a storage vessel 99 provided with a liquid level control 100. Dilution water is supplied to vessel 99 through a conduit 101 and the anti-foam agent is delivered to a spray device 102 positioned in the upper end of chamber 42 through a conduit 103 by a pump 104. A plurality of flat, tilted baffles or trays 105 are arranged in chamber 42 to permit fallout and separation of the sand.

OPERATION

In operation of the system, a mixture or slurry of water, oil and sand is delivered through conduit 18 to cyclone 50 in which oily sand is separated from the feed slurry. The oil and water separated in cyclone 50 are removed through conduit 19 and returned to tank 14 for reprocessing. Oily sand separated in cyclone 50 falls into compartment 30 through sand delivery tube 51. The liquid level in compartment 30 is controlled by trough 44. Oily foam on the surface of the liquid in compartment 30 flows into compartment 42 where the sand is separated from the foam by flowing the foam over trays 105 and spraying the foam with a defoaming agent pumped by pump 104 from receptacle 99 through conduit 103. The sand separated from the foam in compartment 42 is returned to compartment 30 through conduit 92 by a pumping liquid slurry bled from conduit 65 and fed through jet pump 93. The sand which falls into compartment 30 settles to the bottom thereof. The sand is then pumped in the foam of a slurry from sump 36a to cyclone 52 through conduit 65 by pump 66. A cleansing agent may be added to the sand slurry in conduit 65 through conduit 69. In cyclone 52 the sand is washed by combined action of the cleansing agent and shearing action caused by impact of the sand on the wall of the cyclone and separated from the liquid phase by combined centrifugal and centripetal forces. The action of the liquids in the cyclone causes air, supplied from the atmosphere above the liquid level in compartments 30, 32 and 34 when gas tight covers on these compartments are not used or from an air source (indicated as gas source) when gas tight covers are used, to be sucked up the center of the vortex formed by the swirling liquid mixture in the cyclone and beaten into the liquid to form small air bubbles in the liquid. The oil attaches to the surface area provided by these small air bubbles. The oil, water and cleansing agent separated in cyclone 52 are recirculated to compartment 30 through conduit 8. The bubbles in the liquid rise to the surface in floatation compartment 30 to aid in the separation of the oil and water. The sand separated in cyclone 52 falls into compartment 32 through tube 53. The liquid level in compartment 32 is controlled by trough 38 which is located above trough 44 so that excess liquid in compartment 32 overflows into compartment 30 over trough 38 through opening 37. The sand settles to the bottom of compartment 32 and is pumped, as a slurry from sump 36b through conduit 67 into cyclone 54 by means of pump 68. A cleansing agent may be added to the sand slurry in conduit 67 through conduit 69. The aerated liquid phase separated in cyclone 54 is recirculated to compartment 32 through conduit 9. The sand separated in cyclone 54 falls into compartment 34. The liquid level of the liquid in compartment 34 being controlled by the height of trough 40 is above trough 38 overflows into compartment 32 through opening 39. As the sand settles to the bottom of compartment 34, it is rinsed by water through perforated conduits 60a and 60b prior to being flushed periodically by a timer from compartment 34 by a jet pump 78 connected to the sand slurry discharge conduit 75. The clean sand is pumped into compartment 77 through tube 76. Tube 76 pivots, as indicated in FIG. 4, to adjust the liquid level of the liquid in compartment 34. The clean sand and water slurry in compartment 77 is discharged through conduits 82 and 21. Valve 84 might be used to discharge the sand slurry from compartment 34 in the event jet pump 78 is not used.

In this system the oil as well as the sand cleansing agent are washed off the sand prior to disposal of the sand. More liquid is introduced into the system than actually leaves with the sand. Although a cyclone 50 is used to provide initial separation of the oily sand and water and oil mixture, other types of separation might be used for this purpose. In addition, rinse compartment 34 may be omitted or additional rinse compartments might be added in particular applications of the system and process. Also, rinse compartment 32 and floatation compartment 30 might, if desired, be provided with water rinse piping such as is employed in rinse compartment 34. Further, although the use of a cleansing agent in the washing process is preferred, and in some cases may be essential depending upon the difficulty in separation of the oil from the oil coated surface, the cleansing agent may be omitted, if desired, in certain applications.

The vortex or cyclone separators 50, 52 and 54 utilize centrifugal, centripetal and gravity forces to separate the liquid-solid mixture into its components of different specific gravity. The cyclones are of conventional design and may be suitably of the type discussed and shown on pages 3932 to 3935 of the Composite Catalog of Oil Field Equipment and Services, 1966–67 edition, published by World Oil. The inner wall of each cyclone is preferably lined with a replaceable sleeve made of material such as polyurethane or butylrubber which is durable and also provides a frictional surface to aid in washing the oil from the sand. The sand cleansing agent may be any suitable nontoxic surfactant. The foam breaker or anti-foam agent is preferably silicone. The use of a non-oxidizing gas, such as methane (natural gas) is preferred over air in instances where iron ions are present in the water being treated in order to prevent the formation of iron oxide and to inhibit corrosion. The non-oxidizing gas might be introduced into the cyclone, as shown in FIG. 2, by submersing the bottom of each cyclone in the gas-filled cavity, supplied from a gas source as indicated, formed between the gas-tight cover on each compartment and the liquid level in each compartment.

While the invention has been described herein with reference to cleaning sand produced with oil production liquids, other uses will be apparent to those skilled in this art. For example, the invention would be useful in cleaning cuttings prior to disposal thereof which have been separated from oil well drilling muds. In such an operation the separated cuttings would be dropped by gravity feed into the first (floatation) compartment.

Other changes and modifications may be made in the specific illustrative embodiments of the invention shown Having fully described the apparatus, operation, advantages and objects of my invention, I claim:

1. A system for cleaning oily solid material comprising:
   a floatation compartment;
   a cyclone for washing oily solid material contained in a slurry of oil and water and for separating said washed solid material from said slurry;
   means for pumping said slurry from the bottom of said floatation compartment into said cyclone;
   means for recirculating the aerated liquid phase separated from said slurry in said cyclone into said flotation compartment, the gas bubbles in said liquid phase aiding in flotation the oil to the surface of the liquid in said flotation compartment;
   a rinse compartment;
   means for discharging said separated solid material from said cyclone into said rinse compartment; and
   means permitting liquid in said rinse compartment to overflow into said floatation compartment.

2. A system as recited in claim 1 in which said solid material consists essentially of sand.

3. A system as recited in claim 1 in which said gas consists essentially of air.

4. A system as recited in claim 1 including means for introducing cleansing agent into said slurry pumped into said cyclone.

5. A system as recited in claim 1 including
   another cyclone for washing solid material contained in another slurry of oil and water and for separating said solid material from said other slurry;
   means for pumping said other slurry from the bottom of said rinse compartment into said other cyclone;
   means for recirculating the aerated liquid phase separated from said other slurry in said other cyclone into said rinse compartment, the gas bubbles aiding in floating the oil to the surface of the liquid in the rinse compartment;
   a second rinse compartment;
   means for discharging the separated solid material from said other cyclone into said other rinse compartment; and
   means for permitting liquid in said other rinse compartment to overflow into said rinse compartment.

6. A system as recited in claim 5 in which said solid material consists essentially of sand and said gas consists essentially of air.

7. A system as recited in claim 5 including means for introducing surfactant into said slurry being pumped into said cyclone.

8. A system as recited in claim 5 including means for introducing surfactant into said other slurry being pumped into said other cyclone.

9. A system as recited in claim 5 including means for rinsing said solid material discharged into said other rinse compartment.

10. A system as recited in claim 5 including
    a solid material-foam compartment;
    baffle means in said solid material-foam compartment;
    means permitting liquid in said floatation compartment to overflow into said solid material-foam compartment; and
    means for introducing an anti-foam agent into said solid material-foam compartment.

11. A method for cleaning oily solid material comprising the steps of:
    washing a slurry of solid material, oil and water in a cyclone;
    separating said solid material from said slurry in said cyclone;
    pumping said slurry from the bottom of a floatation compartment into said cyclone;
    recirculating the aerated liquid phase separated from said slurry in said cyclone to said floatation compartment, the gas bubbles aiding in floating the oil to the surface of the liquid in said floatation compartment;
    discharging said separated solid material from said cyclone into a rinse compartment; and
    overflowing liquid from said rinse compartment into said floatation compartment.

12. A method as recited in claim 11 including adding surfacetant to said slurry prior to washing and separating said solid material from said slurry in said cyclone.

13. A method as recited in claim 11 including
    washing another slurry of solid material and liquid pumped from the bottom of said rinse compartment in another cyclone;
    separating said solid material from said other slurry in said other cyclone;
    recirculating the aerated liquid phase separated from said other slurry in said other cyclone into said rinse compartment, the gas bubbles aiding in floating the oil to the surface of the liquid in said rinse compartment;
    discharging the separated solid material from said other cyclone into another rinse compartment; and
    overflowing liquid from said other rinse compartment into said rinse compartment.

14. A method as recited in claim 13 including adding surfactant to said slurry prior to washing and separating said solid material from said slurry in said cyclone.

15. A method as recited in claim 13 including adding surfactant to said other slurry prior to washing and separating said solid material from said other slurry in said other cyclone.

16. A method as recited in claim 13 including overflowing liquid from said floatation compartment into a solid material-foam compartment; and introducing an anti-foam agent into said solid material-foam compartment.

17. A system for cleaning oily solid material comprising:
    a floatation compartment;
    a cyclone for washing and separating the solid material from said slurry and for causing gas bubbles to form in the liquid of said slurry;
    means for transferring said slurry from said floatation compartment into said cyclone;
    means for recirculating the liquid separated from said slurry in the cyclone into said floatation compartment, the gas bubbles aiding in floating the oil to the surface of the liquid in said flotation compartment;
    a rinse compartment; and
    means for discharging the separated solid material from said cyclone into said rinse compartment.

18. A system as recited in claim 17 including means for introducing cleansing agent into said slurry transferred into said cyclone.

19. A method for cleaning oily solid material comprising the steps of:
    washing a slurry of solid material, oil and water in a cyclone;
    separating said solid material from said slurry in said cyclone;
    recirculating the liquid separated from said slurry in said cyclone into said floatation compartment, said cyclone causing gas bubbles to form in the liquid of said slurry, said gas bubbles aiding in floating the oil to the surface of the liquid in said floatation compartment; and
    discharging said separated solid material from said cyclone into a rinse compartment.

20. A method as recited in claim 19 including adding surfactant to said slurry prior to washing and separating said solid material from said slurry in said cyclone.

21. A method as recited in claim 20 in which said gas comprises air.

22. A method as recited in claim 20 in which said gas comprises a non-oxidizing gas.

23. A system for cleaning solid material contained in a slurry of said solid material and lighter and heavier liquids comprising:
   a floatation compartment;
   a cyclone for washing and separating the solid material from said slurry and for causing gas bubbles to form in the liquid of said slurry;
   means for transferring said slurry from said floatation compartment into said cyclone;
   means for recirculating the liquid separated from said slurry in the cyclone into said flotation compartment, the gas bubbles aiding in floating said lighter liquid to the surface of the liquids in said flotation compartment;
   a rinse compartment; and
   means for discharging the separated solid material from said cyclone into said rinse compartment.

References Cited

UNITED STATES PATENTS

| | | | |
|---|---|---|---|
| 3,212,234 | 10/1965 | McMinn | 55—45 X |
| 3,376,977 | 4/1968 | Gordon et al. | 55—171 X |
| 3,396,512 | 8/1968 | McMinn et al. | 210—73 X |

MICHAEL ROGERS, Primary Examiner

U.S. Cl. X.R.

55—45, 177; 210—73, 195, 202, 512